US012755152B2

(12) United States Patent
Seo et al.

(10) Patent No.: US 12,755,152 B2
(45) Date of Patent: Oct. 6, 2026

(54) METHOD AND SYSTEM FOR A TEMPERATURE-RESILIENT NEURAL NETWORK TRAINING MODEL

(71) Applicants: Jae-sun Seo, Tempe, AZ (US); Jian Meng, Tempe, AZ (US); Li Yang, Tempe, AZ (US); Deliang Fan, Tempe, AZ (US)

(72) Inventors: Jae-sun Seo, Tempe, AZ (US); Jian Meng, Tempe, AZ (US); Li Yang, Tempe, AZ (US); Deliang Fan, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 522 days.

(21) Appl. No.: 18/463,778

(22) Filed: Sep. 8, 2023

(65) Prior Publication Data

US 2024/0095528 A1 Mar. 21, 2024

Related U.S. Application Data

(60) Provisional application No. 63/375,129, filed on Sep. 9, 2022.

(51) Int. Cl.
*G06N 3/08* (2023.01)
*G06N 3/04* (2023.01)
*G06N 3/0495* (2023.01)

(52) U.S. Cl.
CPC ............. *G06N 3/08* (2013.01); *G06N 3/0495* (2023.01)

(58) Field of Classification Search
CPC ........ G06N 3/08; G06N 3/0495; G06N 3/045; G06N 3/0464; G06N 3/084; G06N 3/096; G06N 3/065
See application file for complete search history.

(56) References Cited

U.S. PATENT DOCUMENTS

2016/0328642 A1* 11/2016 Himebaugh .......... G06F 1/3209
2019/0303750 A1* 10/2019 Kumar .................. G06F 7/5443
2022/0101085 A1* 3/2022 Garcia Redondo .......................... G11C 13/0069

FOREIGN PATENT DOCUMENTS

CN 119938171 A * 5/2025 ............. G06N 3/042

OTHER PUBLICATIONS

B. Feinberg, S. Wang, and E. Ipek, "Making memristive neural network accelerators reliable," in Proc. IEEE Int. Symp. High Perform. Comput. Archit., 2018, pp. 52-65.

(Continued)

*Primary Examiner* — Masud K Khan
(74) *Attorney, Agent, or Firm* — Riverside Law LLP

(57) ABSTRACT

A method for increasing the temperature-resiliency of a neural network, the method comprising loading a neural network model into a resistive nonvolatile in-memory-computing chip, training the deep neural network model using a progressive knowledge distillation algorithm as a function of a teacher model, the algorithm comprising injecting, using a clean model as the teacher model, low-temperature noise values into a student model and changing, now using the student model as the teacher model, the low-temperature noises to high-temperature noises, and training the deep neural network model using a batch normalization adaptation algorithm, wherein the batch normalization adaptation algorithm includes training a plurality of batch normalization parameters with respect to a plurality of thermal variations.

7 Claims, 11 Drawing Sheets

(56) References Cited

OTHER PUBLICATIONS

F. M. Puglisi, L. Larcher, A. Padovani, and P. Pavan, "A complete statistical investigation of RTN in HfO2-based RRAM in high resistive state," IEEE Trans. Electron Devices, vol. 62, No. 8, pp. 2606-2613, Aug. 2015.
G. Hinton, O. Vinyals, and J. Dean, "Distilling the knowledge in a neural network," 2015, arXiv:1503.02531. [Online]. Available: https://arxiv.org/abs/1503.02531.
H. Shin, M. Kang, and L.-S. Kim, "A thermal-aware optimization framework for ReRAM based deep neural network acceleration," in Proc. IEEE/ACM Int. Conf. Comput. Aided Des., 2020, pp. 1-9.
J. Choi et al., "Accurate and efficient 2-bit quantized neural networks," in Proc. Conf. Mach. Learn. Syst., 2019, pp. 348-359.
L. H. Tsai et al., "Robust processing-in-memory neural networks via noise-aware normalization," 2020, arXiv:2007.03230. [Online]. Available: https://arxiv.org/ abs/2007.03230.
M. Cheng et al., "TIME: A training-in-memory architecture for RRAM-based deep neural networks," IEEE Trans. Comput.-Aided Design Integr. Circuits Syst., vol. 38, No. 5, pp. 834 847, May 2019.
M. V. Beigi and G. Memik, "Thermal-aware optimizations of ReRAM-based neuromorphic computing systems," in Proc. IEEE/ACM Des. Autom. Conf., 2018, pp. 1-6.
P. Izmailov et al., "Averaging weights leads to wider optima and better generalization," in Proc. Conf. Uncertainty Artif. Intell., 2018, pp. 876-885.
R. Gao et al., "Convergence of adversarial training in overparametrized neural networks," Adv. Neural Inf. Process. Syst., vol. 32, pp. 13029-13040, 2019.
R. Krishnamoorth, "Quantizing deep convolutional networks for efficient inference: A whitepaper," 2018, arXiv:1806.08342. [Online]. Available: https://arxiv.org/abs/1806.08342.
T. Yang, S. Kim, P. R. Kinget, and M. Seok, "Compact and supply-voltage-scalable temperature sensors for dense on-chip thermal monitoring," IEEE J. Solid-State Circuits, vol. 50, No. 11, pp. 2773-2785, Nov. 2015.
W. Shim et al., "Two-step write-verify scheme and impact of the read noise in multilevel RRAM-based inference engine," Semicond. Sci. Technol., vol. 35, No. 11, 2020, Art. No. 115026.
W. Shim, J. Meng, X. Peng, J.-S. Seo, and S. Yu, "Impact of multilevel retention characteristics on RRAM based DNN inference engine," in Proc. IEEE Int. Rel. Phys. Symp., 2021, pp. 1-4.
X. Peng, S. Huang, Y. Luo, X. Sun, and S. Yu, "DNN NeuroSim: An end-to-end benchmarking framework for compute-in-memory accelerators with versatile device technologies," in Proc. IEEE Int. Electron Devices Meeting, 2019, pp. 32.5.1-32.5.4.
Y. Bengio, N. L_eonard, and A. Courville, "Estimating or propagating gradients through stochastic neurons for conditional computation," 2013, arXiv:1308.3432. [Online]. Available: https://arxiv.org/abs/1308.3432.
Y. LeCun, Y. Bengio, and G. Hinton, "Deep learning," Nature, vol. 521, pp. 436-444, 2015.
Y. Xiang et al., "Impacts of state instability and retention failure of filamentary analog RRAM on the performance of deep neural network," IEEE Trans. Electron Devices, vol. 66, No. 11, pp. 4517-4522, Nov. 2019.
Z. He, J. Lin, R. Ewetz, J. Yuan, and D. Fan, "Noise injection adaption: End-to-end ReRAM crossbar nonideal effect adaption for neural network mapping," in Proc. 56th ACM/IEEE Des. Autom. Conf., 2019, pp. 1-6.

* cited by examiner

METHOD AND SYSTEM FOR A TEMPERATURE-RESILIENT NEURAL NETWORK TRAINING MODEL

CROSS-REFERENCE TO RELATED APPLICATIONS

This application claims priority to U.S. Provisional Patent Application No. 63/375,129, filed on Sep. 9, 2022, incorporated herein by reference in its entirety.

STATEMENT REGARDING FEDERALLY SPONSORED RESEARCH OR DEVELOPMENT

This invention was made with government support under grant nos. 1652866, 1715443, and 1740225 awarded by the National Science Foundation. The government has certain rights in the invention.

BACKGROUND OF THE INVENTION

Nowadays, resistive random-access memory (RRAM) based in-memory computing (IMC) has been used to accelerate the efficiency of deep neural networks (DNN). However, DNN architectures tend to compute at an extremely fast pace in a small area, resulting in an increased power density, and, thus, an elevation in temperature of the system. When the temperature increases, the ability to hold the programed values becomes weaker and the RRAM conductance starts to drift away. Such variation will affect the macro-level IMC results, layer-by-layer computations, and eventually the final output of the DNN, leading to incorrect inference predictions. Therefore, the RRAM-based DNN accelerator should have a more stringent retention requirement compared with the nonvolatile memory (NVM) storage. To avoid the DNN accuracy loss caused by the conductance drifting, very frequent refresh operations will be required, but this introduces a large amount of additional energy consumption to the accelerator system. Therefore, alleviating the thermal retention issue becomes critical for energy-efficient RRAM-based IMC accelerator design.

This catalyzes researchers to develop algorithms that can adapt the DNN model to become resilient to temperature changes. Temperature-aware refreshing techniques (Y. Xiang et al., "Impacts of state instability and retention failure of filamentary analog RRAM on the performance of deep neural network," *IEEE Trans. Electron Devices*, vol. 66, no. 11, pp. 4517-4522, November 2019) were designed to adjust the refreshing frequency based on the operating temperature. The on-device tuning algorithm (M. Cheng et al., "TIME: A training-in-memory architecture for RRAM-based deep neural networks," *IEEE Trans. Comput. Aided Design Integr. Circuits Syst.*, vol. 38, no. 5, pp. 834-847, May 2019) reduced the refreshing frequency by updating the conductance based on the saturation boundary of the RRAM device. In addition to the refreshing techniques, array-level column swapping techniques (M. V. Beigi and G. Memik, "Thermal-aware optimizations of ReRAM-based neuromorphic computing systems," in Proc. *IEEE/ACM Des. Autom. Conf.,* 2018, pp. 1-6) (H. Shin, M. Kang, and L.-S. Kim, "A thermal-aware optimization framework for ReRAM-based deep neural network acceleration," in Proc. *IEEE/ACM Int. Conf. Comput. Aided Des.,* 2020, pp. 1-9) change the RRAM mapping scheme by swapping the important weight from a higher temperature area with the cells from a lower temperature area. In Shin et al.'s work, (L. H. Tsai et al., "Robust processing-in-memory neural networks via noise-aware normalization," 2020, arXiv:2007.03230. [Online]. Available: https://arxiv.org/abs/2007.03230) to cope with general noise in analog neural networks, the batch normalization (BN) parameters are recalibrated by using the exponential moving average (EMA) while injecting synthetic Gaussian noise to the weight. Some prior works modeled the conductance variations as an additive Gaussian noise with zero mean and temperature-related standard deviations. (Z. He, J. Lin, R. Ewetz, J. Yuan, and D. Fan, "Noise injection adaption: End-to-end ReRAM crossbar nonideal effect adaption for neural network mapping," in *Proc. 56th ACM/IEEE Des. Autom. Conf.,* 2019, pp. 1-6) (B. Feinberg, S. Wang, and E. Ipek, "Making memristive neural network accelerators reliable," in *Proc. IEEE Int. Symp. High Perform. Comput. Archit.,* 2018, pp. 52-65).

Considering the critical retention failure issue of RRAM, real-time hardware information or post-mapping on-device manipulations may be required; these are expansive for practical applications and possess a lack of generality for device-vary characteristics. Modeling the RRAM non-ideality into Gaussian noises cannot accurately depict the chronological non-ideality of the real devices. Herein, the RRAM retention failure based on the actual chip measurement is precisely modeled and represents a novel algorithm and thermal-aware in-memory-computing engine, which considers both thermal changes and time variations, and enables the one-time model deployment without second-time model deployment or extra knowledge of RRAM cells.

Thus, there is a need in the art for a method and device for a temperature-resilient neural network training model in order to reduce drift, retention failure, and ultimately inference accuracy degradation.

SUMMARY OF THE INVENTION

In one aspect, the method for a temperature-resilient neural network model architecture, comprising: loading a deep neural network model into a nonvolatile memory; training the deep neural network model using a progressive knowledge distillation algorithm as a function of a teacher model, the algorithm involving injecting, using a clean model as the teacher model, low-temperature noises into a student model and changing, now using the student model as the teacher model, the low-temperature noises to high-temperature noises; and training the deep neural network model using a batch normalization adaptation algorithm, wherein the batch normalization adaptation algorithm includes training a plurality of batch normalization parameters with respect to a plurality of thermal variations.

In some embodiments, the nonvolatile memory is a random-access memory.

In some embodiments, the nonvolatile memory is a resistive random-access memory.

In some embodiments, the low-temperature noises are generated based on a temporally averaged variation between 0 and 10,000 seconds.

In some embodiments, the batch normalization adaptation algorithm includes freezing a weight update process of a plurality of layered subarrays.

In some embodiments, the low-temperature noises are injected at the plurality of thermal variations.

In some embodiments, each thermal variation of the plurality of thermal variations corresponds to a set of batch normalization parameters of the plurality of batch normalization parameters.

In some embodiments, the progressive knowledge distillation algorithm is implemented at a thermal variation between 25 and 35 degrees Celsius with 20 epoch fine-tuning.

In some embodiments, the batch normalization adaptation algorithm is implemented at thermal variations of 55, 85, and 120 degrees Celsius with 20 epoch fine-tuning for each.

In one aspect, the device contemplated herein comprises a temperature-resilient neural network model architecture, comprising: a nonvolatile memory comprising a plurality of layered subarrays, wherein each subarray comprises 256 rows and 256 columns of nonvolatile memory cells; a temperature sensor configured to detect an analog temperature of the nonvolatile memory; a converter configured to digitize the analog temperature; a multiplexer connected to the converter and configured to select, from a global buffer, a set of batch normalization parameters as a function of the digitized analog temperature; and a fixed-point computing unit wherein batch normalization occurs.

In some embodiments, wherein the nonvolatile memory is a random-access memory.

In some embodiments, the nonvolatile memory is a resistive random-access memory.

In some embodiments, each nonvolatile memory cell stores 2 bits.

In some embodiments, the converter is a 16-bit analog-to-digital converter.

In some embodiments, further comprising a flash converter connected to 3 sense amplifiers.

In some embodiments, the set of batch normalization parameters are chosen from a plurality of sets.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

Figure 1:
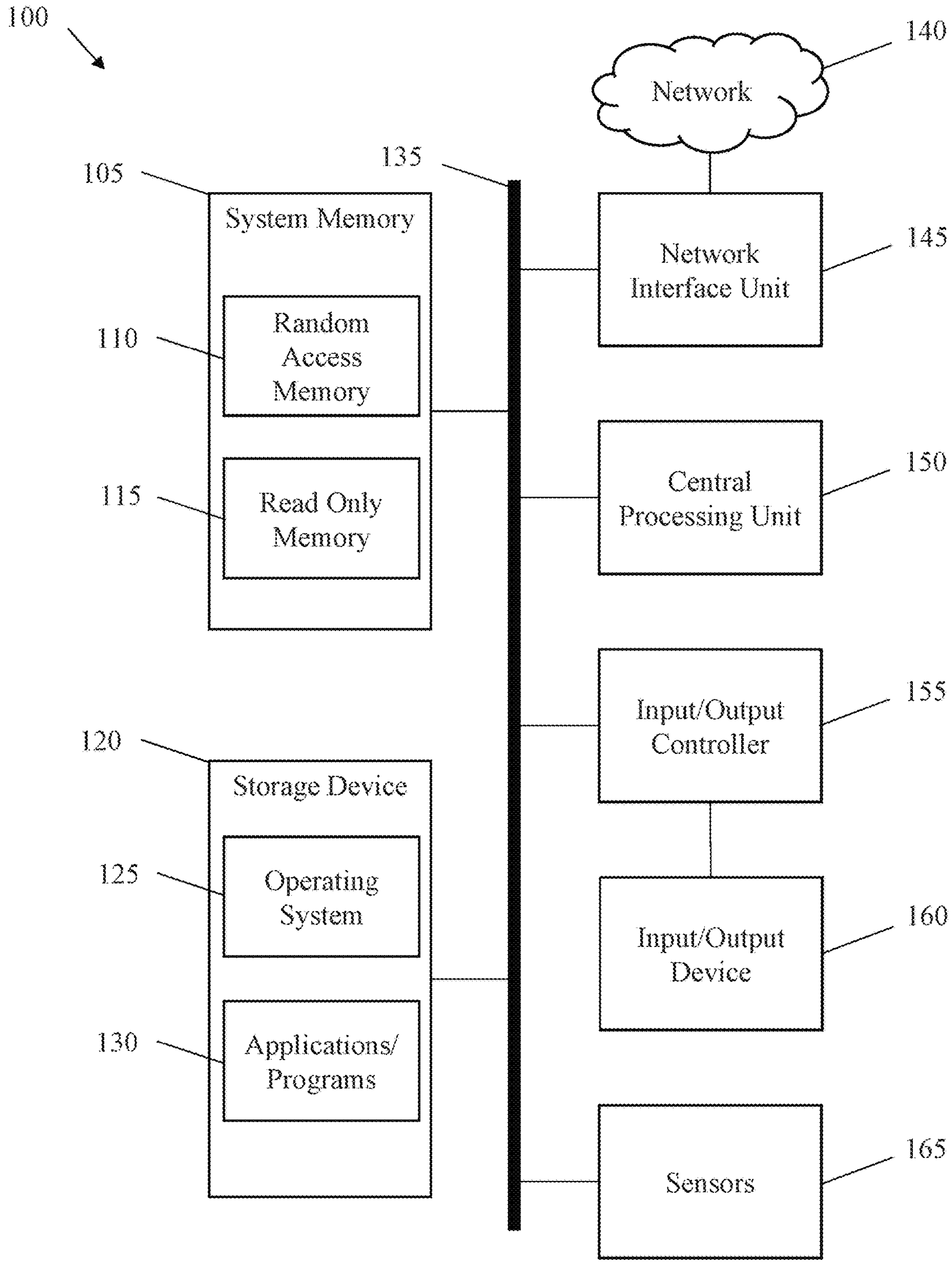
FIG. 1 is a diagram of a computing device.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Software & Computing Device

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C #, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

FIG. 1 and the following discussion are intended to provide a brief, general description of a suitable computing environment in which the invention may be implemented. While the invention is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 depicts an illustrative computer architecture for a computer 100 for practicing the various embodiments of the invention. The computer architecture shown in FIG. 1 illustrates a conventional personal computer, including a central processing unit 150 ("CPU"), a system memory 105, including a random-access memory 110 ("RAM") and a read-only memory ("ROM") 115, and a system bus 135 that couples the system memory 105 to the CPU 150. A basic input/output system containing the basic routines that help to transfer information between elements within the computer, such as during startup, is stored in the ROM 115. The computer 100 further includes a storage device 120 for storing an operating system 125, application/program 130, and data.

The storage device 120 is connected to the CPU 150 through a storage controller (not shown) connected to the bus 135. The storage device 120 and its associated computer-readable media provide non-volatile storage for the computer 100. Although the description of computer-readable media contained herein refers to a storage device, such as a hard disk or CD-ROM drive, it should be appreciated by those skilled in the art that computer-readable media can be any available media that can be accessed by the computer 100.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information, and which can be accessed by the computer.

According to various embodiments of the invention, the computer 100 may operate in a networked environment using logical connections to remote computers through a network 140, such as TCP/IP network such as the Internet or an intranet. The computer 100 may connect to the network 140 through a network interface unit 145 connected to the bus 135. It should be appreciated that the network interface unit 145 may also be utilized to connect to other types of networks and remote computer systems.

The computer 100 may also include an input/output controller 155 for receiving and processing input from a number of input/output devices 160, including a keyboard, a mouse, a touchscreen, a camera, a microphone, a controller, a joystick, or other type of input device. Similarly, the input/output controller 155 may provide output to a display screen, a printer, a speaker, or other type of output device. The computer 100 can connect to the input/output device 160 via a wired connection including, but not limited to, fiber optic, Ethernet, or copper wire or wireless means including, but not limited to, Wi-Fi, Bluetooth, Near-Field Communication (NFC), infrared, or other suitable wired or wireless connections.

As mentioned briefly above, a number of program modules and data files may be stored in the storage device 120 and/or RAM 110 of the computer 100, including an operating system 125 suitable for controlling the operation of a networked computer. The storage device 120 and RAM 110 may also store one or more applications/programs 130. In particular, the storage device 120 and RAM 110 may store an application/program 130 for providing a variety of functionalities to a user. For instance, the application/program 130 may comprise many types of programs such as a word processing application, a spreadsheet application, a desktop publishing application, a database application, a gaming application, internet browsing application, electronic mail application, messaging application, and the like. According to an embodiment of the present invention, the application/program 130 comprises a multiple functionality software application for providing word processing functionality, slide presentation functionality, spreadsheet functionality, database functionality and the like.

The computer 100 in some embodiments can include a variety of sensors 165 for monitoring the environment surrounding and the environment internal to the computer 100. These sensors 165 can include a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

Temperature-Resilient Scheme

Considering critical retention failure issues against temperature variations and the limitations of the previous techniques, proposed herein is a temperature-resilient solution, including both new deep neural network (DNN) training algorithms and system-level hardware design, for RRAM-based in-memory computing. Against temperature-dependent RRAM variations over time, the disclosed solution is a novel and simple training algorithm that comprises progressive knowledge distillation (PKD) training and thermal-aware batch normalization adaptation (BNA) training that achieves high robustness with largely improved accuracy without introducing any complex refreshing or deployment schemes. The model uses the circuit-level simulator NeuroSim9, a type of circuit-level macro model, to evaluate the system-level performance under the retention variations. The proposed design has been evaluated on several convolutional neural networks (CNNs) with different mod& sizes and activation/weight precision values for CIFAR-10 and TinyimageNet data sets, demonstrating significant accuracy improvements with elevated model robustness. The Canadian Institute for Advanced Research-10 (CIFAR-10) dataset is a collection of 50,000 training images and 10,000 test images that are commonly used to train machine learning and computer vision algorithms, while the TinyImageNet is a subset of the IlienageNet database and contain 200 classes of images, each carrying 500 training images, 50 validation images, and 50 test images.

Herein, described is a practical and comprehensive analysis with rigorous modeling to investigate the retention failure based on the actual RRAM chip measurement. Provided is also a new DNN training method considering both thermal-changes and time-variations of the conductance drifting, leading to highly robust DNN models. Additionally, a thermal-aware RRAM-based inference engine design is also presented. Performance analysis based on 2 to 4-bit DNNs with CIFAR-10 and TinyimageNet data sets is also illustrated.

Temperature-Dependent RRAM Characteristics and Modeling

Figure 2A:
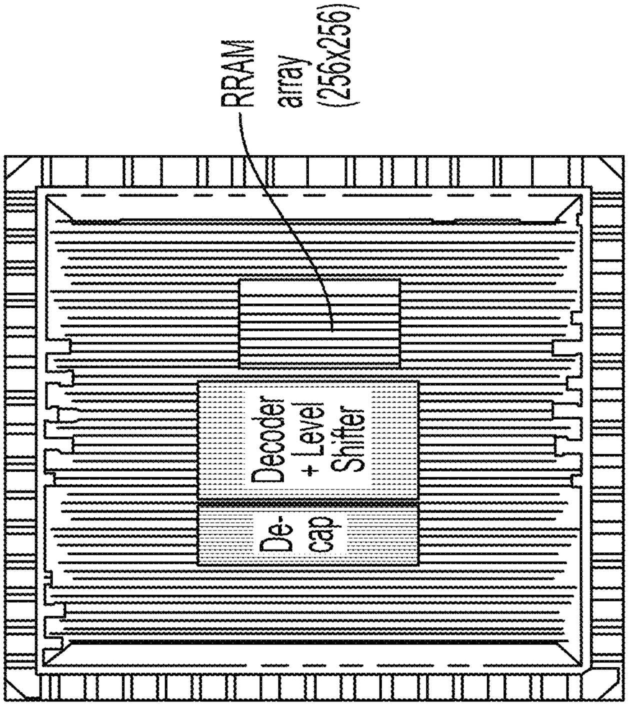
FIG. 2A is an exemplary die photo of an ReRAM one-transistor-one-resistor (1T1R) hafnium oxide ($HfO2$)-based 2-bit-per-cell prototype chip.
Figure 2B:
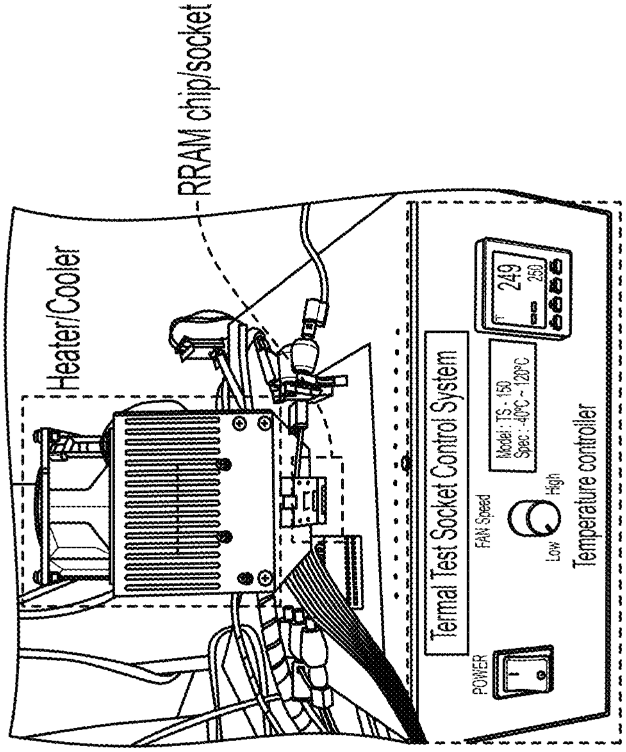
FIG. 2B is an exemplary setup for temperature-controlled equipment connected to the RRAM chip.

In general, RRAM retention failure can be caused by both conductance drifting and dispersion. From the RRAM prototype chip presented herein, actual RRAM conductance variation across different temperatures was detected. As shown in FIG. 2A, the die photo shows an exemplary RRAM prototype chip; the one used herein possessing a 256 row by 256 column array (256×256) composed of one transistor and one resistor (1T1R) hafnium oxide ($HfO_2$) based 2-bit-per cell 90-nanometer RRAM prototype chip along with the peripheral circuits (W. Shim, J. Meng, X. Peng, J.-S. Seo, and S. Yu, "Impact of multilevel retention characteristics on RRAM based DNN inference engine," in Proc. IEEE Int. Rel. Phys. Symp., 2021, pp. 1-4). The conductance of the RRAM cells was measured through a National Instrument PXIe system with different operating temperatures over time. The temperature of the RRAM chip/socket was controlled by TS-150 equipment from Semicon Advance Technology, as shown in FIG. 2B. The chip measurements not only include the thermal characteristics but also contain other device-dependent nonideal effects, such as random telegraph noise (F. M. Puglisi, L. Larcher, A. Padovani, and P. Pavan, "A complete statistical investigation of RTN in HfO2-based RRAM in high resistive state," IEEE Trans. Electron Devices, vol. 62, no. 8, pp. 2606-2613, August 2015).

Static Retention Variations

Figure 2C:
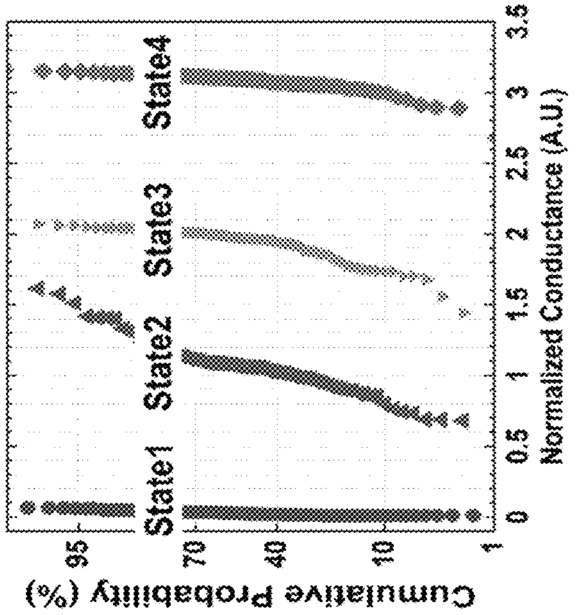
FIG. 2C is a graph depicting an exemplary cumulative probability distribution of the normalized conductance after initial programming at room temperature.

As shown in FIG. 2C, depicted is the cumulative probability distribution of the normalized conductance after initial programming at room temperature, which is 25 degrees Celsius (W. Shim, J. Meng, X. Peng, J.-S. Seo, and S. Yu, "Impact of multilevel retention characteristics on RRAM based DNN inference engine," in Proc. IEEE Int. Rel. Phys. Symp., 2021, pp. 1-4). State 1 represents the high-resistance state (HRS) while state 4 represents the low-resistance state (LRS). The intermediate states 2 and 3 between LRS and HRS are linearly spaced with respect to conductance. The conductance was initialized with the two-step write— verify scheme (W. Shim et al., "Two-step write-verify scheme and impact of the read noise in multilevel RRAM-based inference engine," Semicond. Sci. Technol., vol. 35, no. 11, 2020, Art. No. 115026) at room temperature. The conductance of each state was controlled by SET and RESET current during the iterative SET and RESET loops; the bias conditions (V G and V D) were optimized, respectively, for each state. Once the conductance distributions of the RRAM cells meet the targeted range, the baking temperature was increased (55 degrees Celsius to 120 degrees Celsius) (W. Shim, J. Meng, X. Peng, J.-S. Seo, and S. Yu, "Impact of multilevel retention characteristics on RRAM based DNN inference engine," in Proc. IEEE Int. Rel. Phys. Symp., 2021, pp. 1-4). When the targeted temperature was reached, the stress time counting began and the conductance of the RRAM cells was measured intermittently from 20 to 80,000 seconds.

The measured retention characteristics of the RRAM cells in the prototype chip are characterized as the average conductance drifting p and the standard deviation a (55 degrees Celsius to 120 degrees Celsius) (W. Shim, J. Meng, X. Peng, J.-S. Seo, and S. Yu, "Impact of multilevel retention characteristics on RRAM based DNN inference engine," in Proc. IEEE Int. Rel. Phys. Symp., 2021, pp. 1-4). Overall, the temperature was varied from 25 to 120 degrees Celsius and the RRAM conductance was measured for up to 80,000 seconds at each baking temperature. Based on the measurement results, the retention variation can be modeled based on the changes in μ and σ values for the corresponding retention temperature K and retention time t.

$$\Delta\mu^K = \mu^K(t) - \mu^K_{init} = A^K_\mu \times \log t \quad \text{Equation 1}$$

$$\Delta\sigma^K = \sigma^K(t) - \sigma^K_{init} = B^K_\sigma \times \log t \quad \text{Equation 2}$$

In this static variation scenario, the initial condition of the retention is defined as the measurement starting time, which is 20 seconds, for each baking temperature.

$$A^K_\mu \text{ and } B^K_\sigma$$

are the temperature-dependent drifting rates, which can be modeled through linear regression. These rates can be formulated as:

$$A^K_\mu = m^K_\mu \times \frac{1}{K} + b^K_\mu \quad \text{Equation 3}$$

$$B^K_\sigma = \max\left(m^K_\sigma \times \frac{1}{K} + b^K_\sigma, 0\right) \quad \text{Equation 4}$$

Figure 3A:
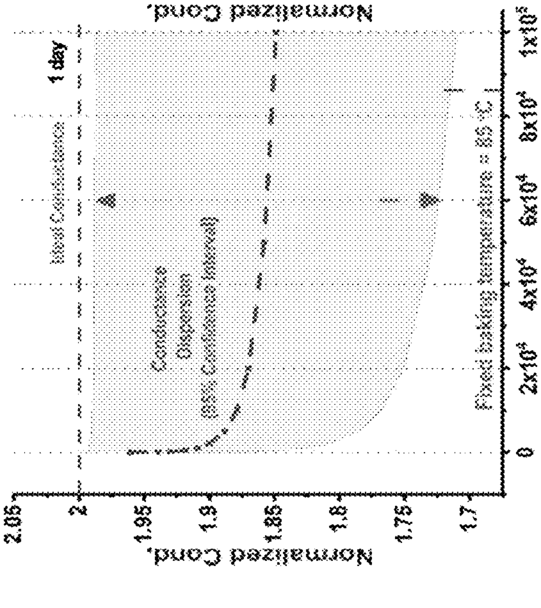
FIG. 3A is an exemplary graph representing the static retention variation statistics at 85 degrees Celsius for 10,000 seconds of testing time.

By combining Equations 1-4, the retention variations can be accurately modeled with Gaussian noises for any given temperature and time. FIG. 3A, as shown, depicts the variation statistics at 85 degrees Celsius baking temperature for 100,000 seconds of testing time.

Dynamic Retention Variations

In addition to the static retention variations observed over time at a fixed temperature, investigated herein is also the dynamic retention variations caused by the temporal temperature changes of the IMAM chip. In practice, if the temperature is increased from $K_1$ to $K_2$, it means that the initial condition at $K_2$ is the variation at the transition point from $K_1$. In the previous section, for static retention variations, the variation based on statistical changes from the initial conditions is modeled. Therefore, the dynamic retention variations can be modeled by accumulating multiple static variations with the updated initial conditions.

Assuming that the temperature change from $K_1$ to $K_2$ happened at time T with the retention statistics of $$R_1 = (\Delta\mu^{K_1}_T, \Delta\sigma^{K_1}_T).$$

Based on Equation 1 and Equation 2, the equivalent statistical changes with respect to $K_2$ can be computed as:

$$\begin{aligned}\Delta\mu^{K_2} &= \mu^{K_2}(t) - \mu^{K_2}_{init} && \text{Equation 5}\\ &= A^{K_2}_\mu \log(t+T') - A^{K_2}_\mu \log(T') && \text{Equation 6}\\ &= A^{K_2}_\mu \log\left(\frac{t+T'}{T'}\right) && \text{Equation 7}\end{aligned}$$

where $$T' = 10^{\Delta\mu^{K_1}_T / A^{K_2}_\mu}.$$

Figure 3B:
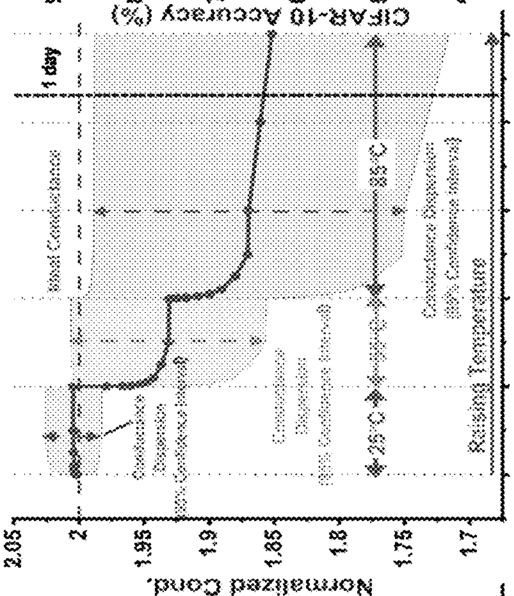
FIG. 3B is a graph representing the dynamic retention variation statistics when the temperature changes from 25 to 55 and then to 85 degrees Celsius for 10,000 seconds of testing time.

In other words, the initial condition of $K_2$ is the equivalent variation (with respect to $K_1$) at time T, which can be represented by the static time T'. $\Delta\sigma^{K_2}$ can also be computed in a similar way. Then, given the total testing time, the dynamic retention variations may be modeled by accumulating the static variations at each temperature step. Shown in FIG. 3B is a particular dynamic retention scenario where the temperature changes from 25 to 55 to 85 degrees Celsius within 100,000 seconds.

Impact of the Retention Variations

Figure 3C:
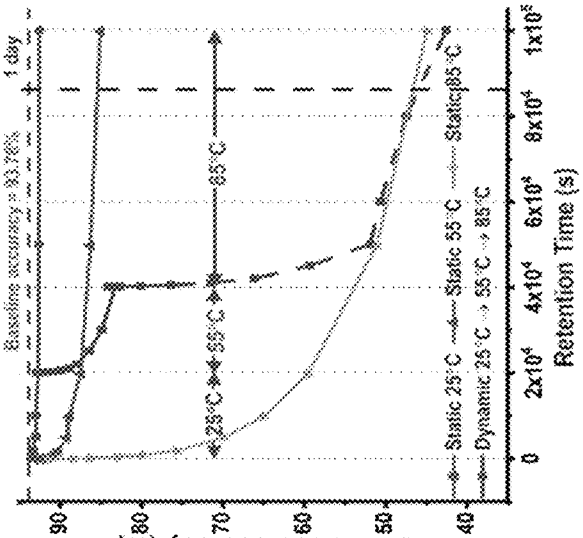
FIG. 3C is a graph representing the inference accuracy of a 2-bit ResNet-18 for a CIFAR-10 dataset for both static and dynamic thermal variations.

Deploying the pretrained quantized DNN model to the RRAM array involves decomposing the low-precision weights down to the bit-level representations. Then, it programs the corresponding conductance values, e.g., mapping one 4-bit weight onto two 2-bit RRAM cells. To understand the impact of the conductance distortions on network-level accuracy, the static and dynamic retention variations of 2-bit RRAM cells are incorporated into a 2-bit ResNet-18 model (i.e., both activation and weight precision values are 2-bit). FIG. 3C shows the inference results obtained from the NeuroSim (X. Peng, S. Huang, Y. Luo, X. Sun, and S. Yu, "DNN NeuroSim: An end-to-end benchmarking framework for compute-in-memory accelerators with versatile device technologies," in Proc. IEEE Int. Electron Devices Meeting, 2019, pp. 32.5.1-32.5.4). Compared to static thermal variation, the inference accuracy degrades faster in the dynamic variation scenario because the non-ideality is inherited and accumulated in both the temperature and time domains. The conductance variations are accumulated and propagated throughout the entire network, eventually leading to accuracy degradation. Employing very frequent refreshing techniques to recover such accuracy degradation in a short time period is expensive. Thus, it is necessary to resolve this critical problem in an energy-efficient way.

Challenges of DNN Training Variation and Noise Injection

Injecting the hardware noise during DNN training is an effective method to improve the robustness of the model. As described previously, the DNN inference process performed by the RRAM hardware will be divided into the bit-level partial sum computations along the columns of the RRAM array (X. Peng, S. Huang, Y. Luo, X. Sun, and S. Yu, "DNN NeuroSim: An end-to-end benchmarking framework for compute-in-memory accelerators with versatile device technologies," in Proc. IEEE Int. Electron Devices Meeting, 2019, pp. 32.5.1-32.5.4). However, injecting the bit-level noise during training requires the decomposition of the quantized weights. Such a decompose-and-reassemble process will largely slowdown the training process and possibly lead to convergence failure. Therefore, to train the model with the injected retention variation, the first challenge is to learn how to inject the bit-level, aka conductance, noises efficiently without limiting the training process.

Figure 4:
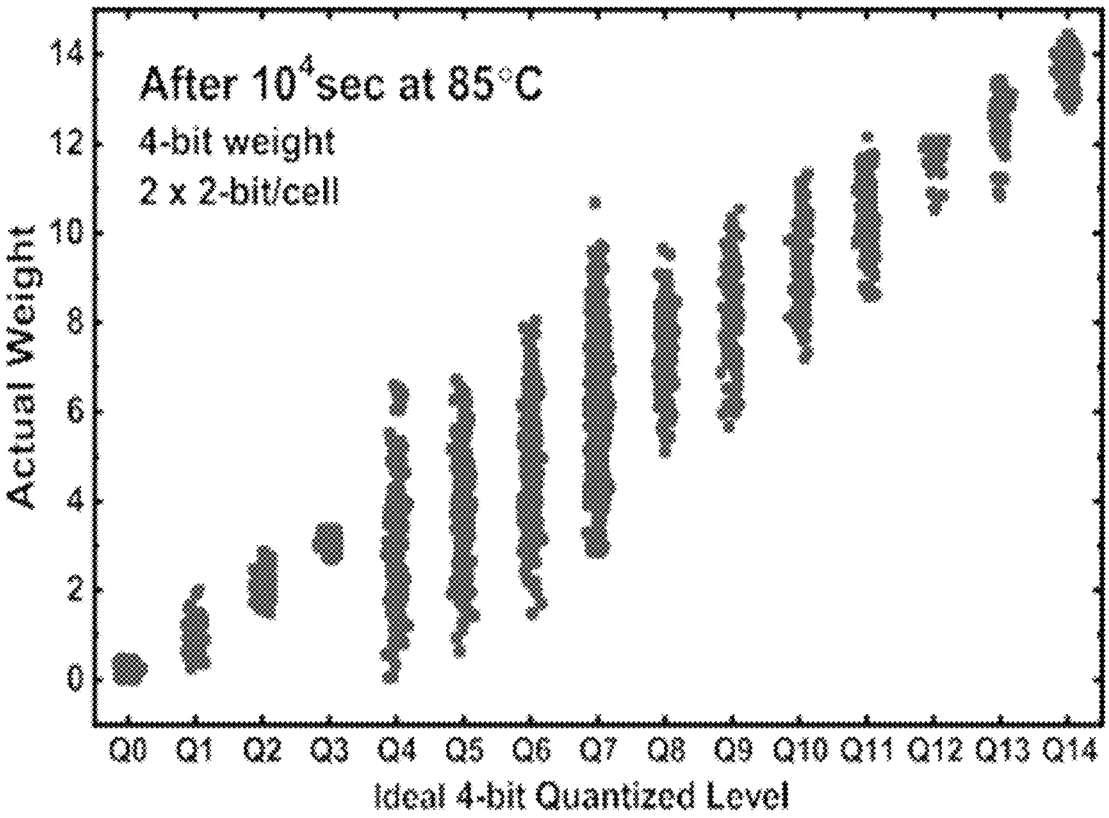
FIG. 4 shows a nonideal distribution graph based on a 4-bit distorted weight with the static thermal variations.

The decomposed computation of in-memory computing is mathematically equivalent to the low-precision convolution computation performed by the software. Thus, the nonideal cell levels (0-3) can be converted to the distorted low-precision weights via the shift-and-add procedure. Shown in FIG. 4 is an example of the nonideal distribution based on 4-bit weights (W. Shim, J. Meng, X. Peng, J.-S. Seo, and S. Yu, "Impact of multilevel retention characteristics on RRAM based DNN inference engine," in Proc. IEEE Int. Rel. Phys. Symp., 2021, pp. 1-4). By subtracting the ideal weight levels from the distorted weights $$W_Q^*,$$

the resultant noise includes magnitude drifting and distribution dispersion. Gaussian noise is injected based on the normalized drift and standard deviation to the corresponding weight levels after the ideal quantization. Given the full-precision weight W and quantization boundary a, the noise injected n-bit in-training quantization process can be formulated as:

$$W_c = \min(\max(W, -a), a)z \quad \text{Equation 8}$$

$$S = (2^{n-1} - 1)/a \quad \text{Equation 9}$$

$$W_Q = \text{round}(W_c \times S) \quad \text{Equation 10}$$

$$W_Q^* = \{W_q + \beta \times \mathcal{N}(\mu_q, \sigma_q)\}_{q=0}^{2^{n-1}} \quad \text{Equation 11}$$

$$W_{QF} = W_Q^*/S \quad \text{Equation 12}$$

Equations 8-10 follow the same procedure as the ideal quantization. $\mu_q$ and $\sigma_q$ represent the mean and standard deviation of the hardware variation noises with respect to each low-precision weight level. The tunable parameter $\beta$ controls the intensity of the noise injection. $W_{QF}$ represents the weights after dequantization from the distorted low-precision weight $$W_Q^*$$

(R. Krishnamoorth, "Quantizing deep convolutional networks for efficient inference: A whitepaper," 2018, arXiv: 1806.08342. [Online]. Available: https://arxiv.org/abs/1806.08342).

Figure 5C:
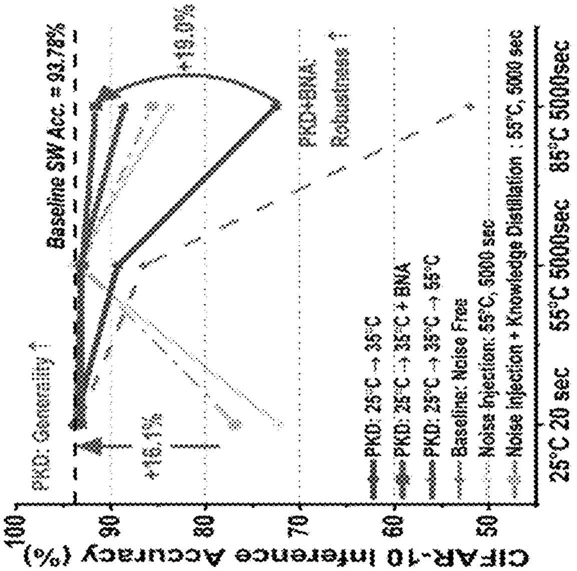
FIG. 5C is a graph representing the DNN hardware inference results after training the 2-bit ResNet-18 for the CIFAR-10 dataset with both the PKD and BNA algorithm.
Figure 5B:
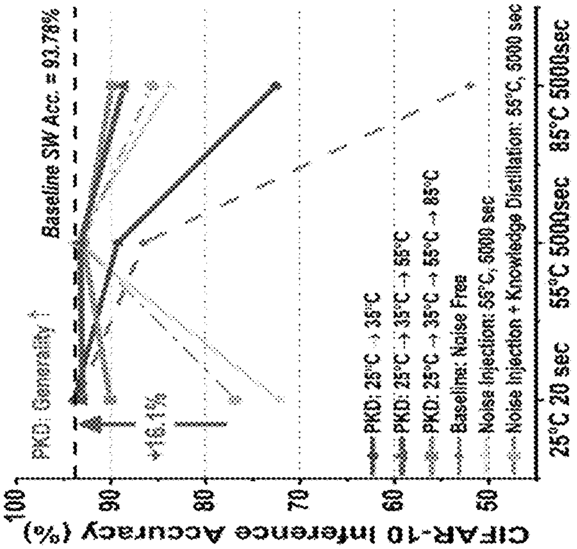
FIG. 5B is an exemplary graph of the DNN hardware inference results after training the 2-bit ResNet-18 for the CIFAR-10 dataset with the PKD algorithm at different temperatures.
Figure 5A:
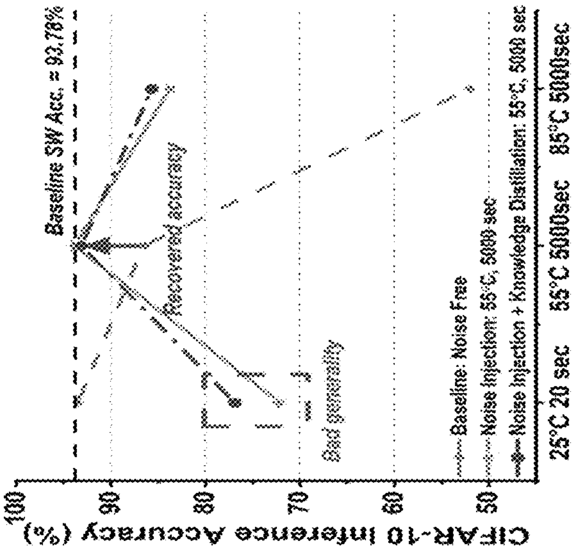
FIG. 5A is an exemplary graph of the DNN hardware inference results after training the 2-bit ResNet-18 for the CIFAR-10 dataset with noise injection.

The noise-injected training is performed to validate the effectiveness of such conversion and is based on a pretrained 2-bit ResNet-18 model and the converted static variation at 55 degrees Celsius for 5,000 seconds. As shown in FIG. 5A, at the selected time and temperature, the resultant model can successfully recover the accuracy even with the decomposed IMC inference. The noise-free clean low-precision model is also used as the teacher to generate the soft labels and distill the knowledge (G. Hinton, O. Vinyals, and J. Dean, "Distilling the knowledge in a neural network," 2015, arXiv: 1503.02531. [Online]. Available: https://arxiv.org/abs/1503.02531) to the noise-injected student; this reduces the performance gap between the two models. As proved by the results in FIG. 5A, the model trained through the knowledge distillation achieved better inference accuracy. The graph in FIG. 5A represents the DNN hardware inference results after training the 2-bit ResNet-18 for the CIFAR-10 dataset with noise injection.

Continuing to refer to FIG. 5A, training the model while injecting the selected noise can only recover the inference performance at the corresponding temperature and time, such as between 25 and 85 degrees Celsius for between 1,000 and 10,000 seconds, or the like. The robustness of the trained model has a bad generality to the different scenarios (25 and 85 degrees Celsius). Similarly, knowledge distillation (G. Hinton, O. Vinyals, and J. Dean, "Distilling the knowledge in a neural network," 2015, arXiv:1503.02531. [Online]. Available: https://arxiv.org/abs/1503.02531) can improve the accuracy of the student model. However, the improvements on generality are limited. Such a generality issue is critical for the hardware inference because the devices usually start operating under the room temperature (25 degrees Celsius), and it is expensive to retrain the deployed DNN model based on the newly changed variations. Therefore, the algorithm and engine disclosed herein improves the general model robustness across different temperature variations without retraining the DNN.

Presented below is a temperature-resilient solution for RRAM-based IMC inference. The disclosure includes a novel training algorithm that improves DNN robustness of the RRAM-based IMC hardware against the thermal variations explained above through the use of both PKD and BNA algorithms.

Proposed Temperature-Resilient RRAM IMC Scheme: PKD Algorithm

Figure 7:
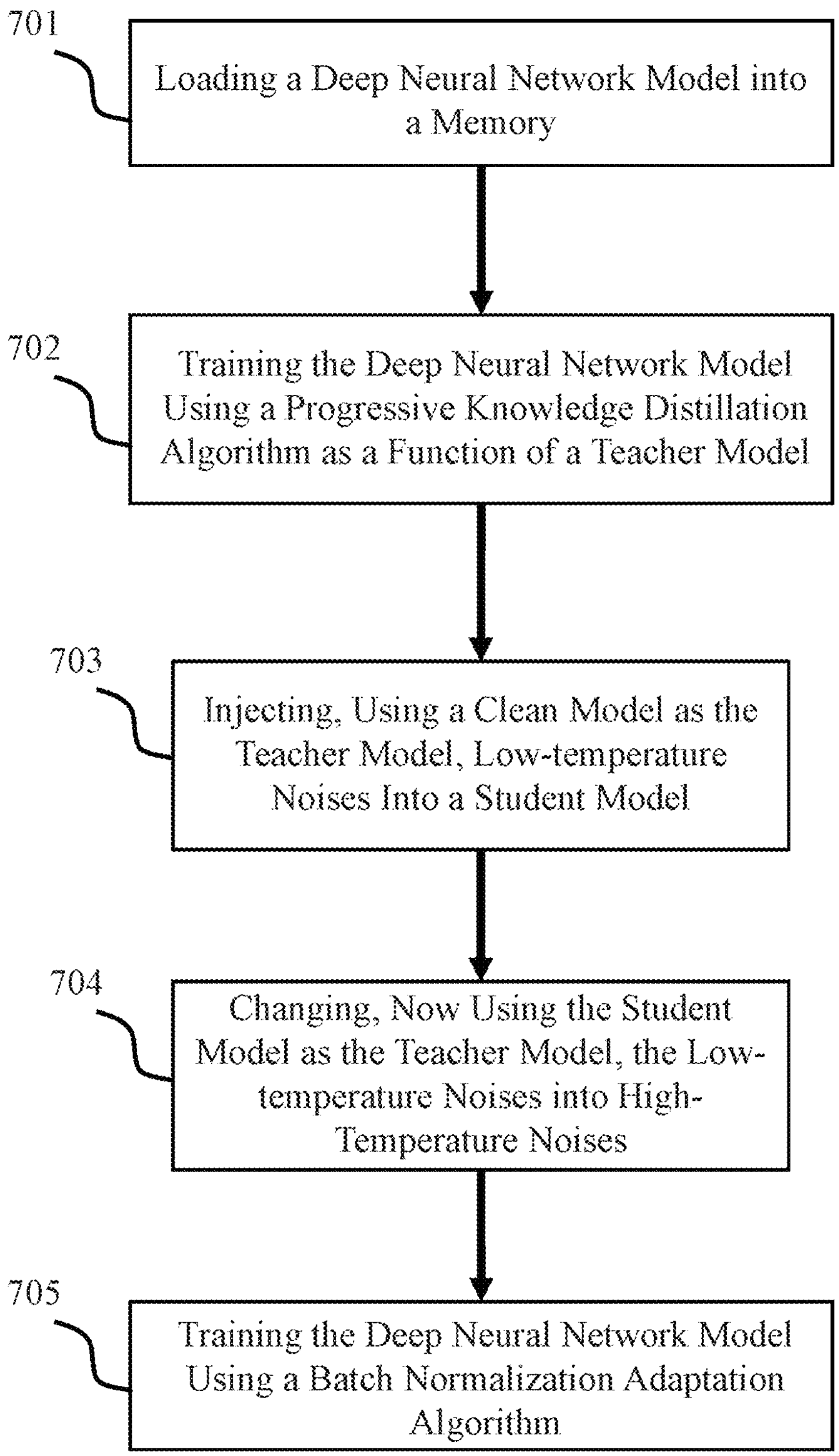
FIG. 7 is a diagram representing a method for machine learning in a temperature-resilient neural network model architecture.

Now referring to FIG. 7, a diagram representing the overall method for machine learning in a temperature-resilient neural network model architecture is shown. At step 701, the method comprises loading a deep neural network model into a nonvolatile memory. Nonvolatile memory may be a random-access memory. Nonvolatile memory may also be a resistive random-access memory. Nonvolatile random-access memory is a random-access memory that retains data without applied power.

Continuing to refer to FIG. 7, at step 702, the method further comprises training the deep neural network model using a progressive knowledge distillation algorithm as a function of a teacher model. A progressive knowledge distillation algorithm may be implemented at a thermal variation between 25 and 35 degrees Celsius with 20 epoch fine-tuning. As explained above, the algorithm comprises injecting, at step 703, using a clean model as the teacher model, low-temperature noise into a student model and changing, at step 704, now using the student model as the teacher model, low-temperature noise to a high-temperature noise. Moreover, the low-temperature noise may be generated based on a temporally averaged variation between 0 and 10,000 seconds. Low-temperature noise may also be injected at the plurality of thermal variations. Each thermal variation of the plurality of thermal variations may correspond to a set of batch normalization parameters of the plurality of batch normalization parameters. The PKD algorithm is further explained below.

The PKD algorithm is utilized to resolve the generality and robustness challenges. As used herein, a progressive knowledge distillation (PKD) algorithm teaches a smaller network, known as the student model, step by step, exactly what to do using a bigger already trained network, known as a teacher model. The PKD algorithm begins the training by injecting low-temperature noise into the student model, while the clean model is employed as the teacher. Subsequently, the injected noise is changed to higher temperature noise, this time while using the previous student model as the new teacher model.

Figure 6:
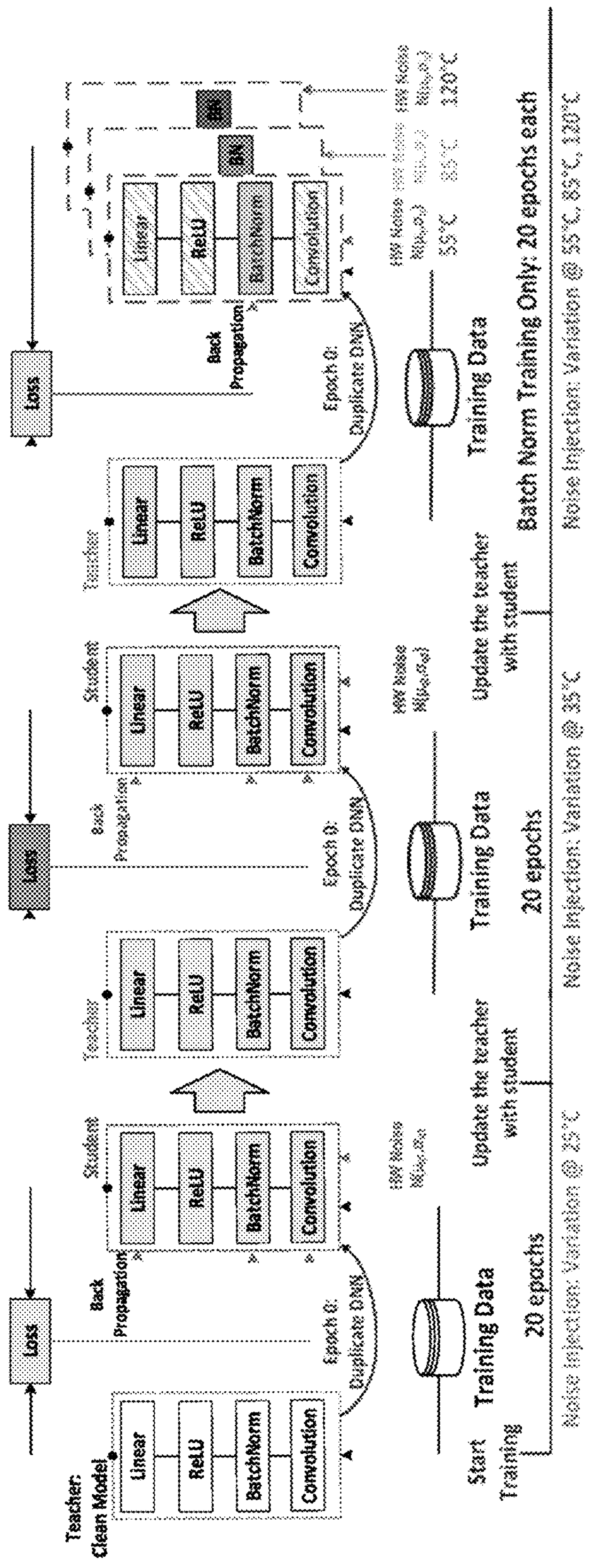
FIG. 6 is a flow diagram of the overall DNN machine learning training process with the PKD algorithm in phase 1 and the BNA algorithm during phase 2.

As shown in FIG. 6, distilling the knowledge in a step-by-step fashion in phase 1 enables the student model to learn the high-temperature variations while matching up with the teacher model that was trained with the low-temperature variations. To further improve the model's generality, the injected noises for each step, or temperature, are generated based on the temporally averaged variation between 0 and 10,000 seconds. The device noise is defined as the deviation between the programmed conductance and drifted conductance. Such bit-level noises are first transformed into the low-precision weight level distortions, as shown in FIG. 4. Specifically, for each temperature, the injected noise is the temporally averaged distortion between 0 and 10,000 seconds. The resultant noises are injected to the corresponded weight level during the PKD-BNA training.

Referring back to FIG. 5B, the disclosed PKD algorithm aided the DNN model to improve generality at the low-temperature while learning the high-temperature variations for better robustness. The model trained by the PKD algorithm that performed noise injection with 55 degrees Celsius variations can fully recover the accuracy under the 55 degrees Celsius scenario, while only having a 0.8% accuracy degradation under the low-temperature 25 degrees Celsius scenario. Compared to the conventional noise injection training method, the significant improvements achieved by the proposed PKD training algorithm demonstrate the potential of the model to maintain a high inference accuracy under different thermal variation scenarios without frequent refreshing. The results presented in FIG. 5B are based on the static variations sampled from a relatively short operating time.

Furthermore, even the improved performance under the high-temperature 85 degrees Celsius scenario still exhibits about 5% accuracy loss. Considering the accuracy degradation with low-temperature variation, naïvely applying the PKD training with incremental noise will gradually make the resulting model performance irreversible to the previous training scenario, thus resulting in degrading the low-temperature inference accuracy even further.

Proposed Temperature-Resilient RRAM IMC Scheme: BNA Algorithm

Referring back to FIG. 7, at step 705, the method comprises also training a deep neural network model using a batch normalization adaptation algorithm. The batch normalization adaptation algorithm includes training a plurality of batch normalization parameters with respect to a plurality of thermal variations. The batch normalization adaptation algorithm may be implemented at thermal variations of 25, 35, 55, 85, and 120 degrees Celsius with 20 epoch fine-tuning for each. Furthermore, batch normalization adaptation algorithm may include freezing a weight update process of a plurality of layered subarrays. The BNA algorithm is further explained below.

To further improve the PKD algorithm, the disclosed BNA algorithm elevates the robustness with high hardware compatibility. As used herein, a batch normalization adaptation algorithm is a method used to make training of DNNs faster and more stable through normalization of the layers' inputs by re-centering and re-scaling.

After the PKD training, a.k.a. Phase 1 in FIG. 6, the weight update process of all the convolutional and fully connected layers is frozen, and then the noise-injection training with a high-temperature variation continues. By doing so, the batch normalization (BM parameters may be individually trained with respect to the different thermal variations while all weights and learnable parameters (e.g., trainable activation quantization range (J. Choi et al., "Accurate and efficient 2-bit quantized neural networks," in Proc, Conf. Mach. Learn. Syst., 2019, pp, 348-359)) remain the same. The output preactivation of each layer may be normalized by the corresponding batch normalization with the measured temperature T. Mathematically, given the current temperature T and the preactivation Y, the normalization can be simply expressed as:

$$Y_{BNA} = W_T \frac{Y - \mu_T}{\sigma_T} + b_T \quad \text{Equation 13}$$

$W_T$ and $b_T$ represents the Batch norm weight and bias at temperature T. $\mu_T$ and $\sigma_T$ represents the batch running mean and standard deviation obtained from the fine-tuning at temperature T.

In FIG. 6, phase 2 shows the training process of the proposed BNA algorithm. BNA trains the BN individually to adapt to the changed activation distribution caused by the thermal variations. Consequently, robustness of the model may be improved even further without changing the values of the DNN weights. As shown in FIG. 5C, normalizing the preactivation by the separately trained BN with 55- and 85-degrees Celsius variations significantly improves the inference accuracy under high-temperature variations. The combination of the BNA algorithm and the model trained under the 35-degrees Celsius variations achieved the best performance with high generality and robustness.

Figure 8B:
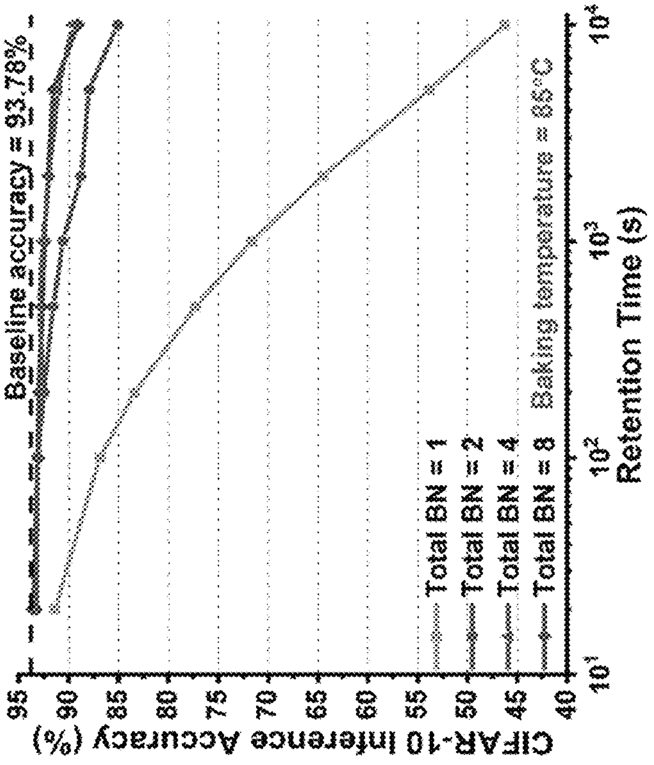
FIG. 8B is an exemplary graph of the 2-bit ResNet-18 inference results training with both the PKD and BNA algorithms at 85 degrees Celsius.
Figure 8A:
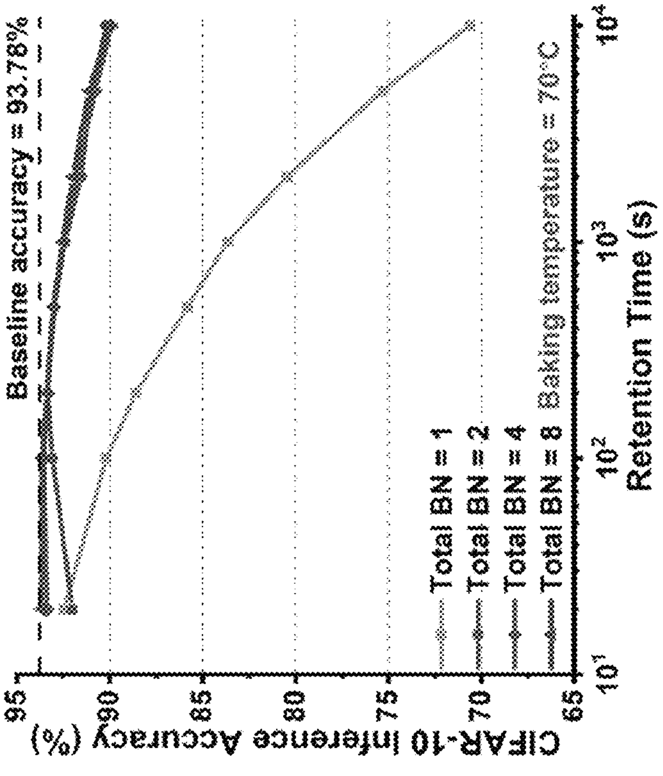
FIG. 8A is a graphical representation of the 2-bit ResNet-18 inference results training with both the PKD and BNA algorithms at 70 degrees Celsius.

However, the only overhead introduced by the proposed BNA algorithm is the extra BN parameters with respect to the different temperature ranges. Given the operating temperature range from 25 to 120 degrees Celsius, FIGS. 8A and 8B show the impact of dividing the total temperature range into different numbers of subsets (BNs) for BNA training. Considering the minimum accuracy and generality difference between the 4-step training, where BN=4, and 8-step training, where BN=8, four adapted sets of BN parameters are chosen to use to cover the temperature ranges of [25° C., 50° C.), [50° C., 70° C.), [70° C., 90° C.), and [90° C., 120° C.].

System-Level Inference Hardware Design

Figure 9:
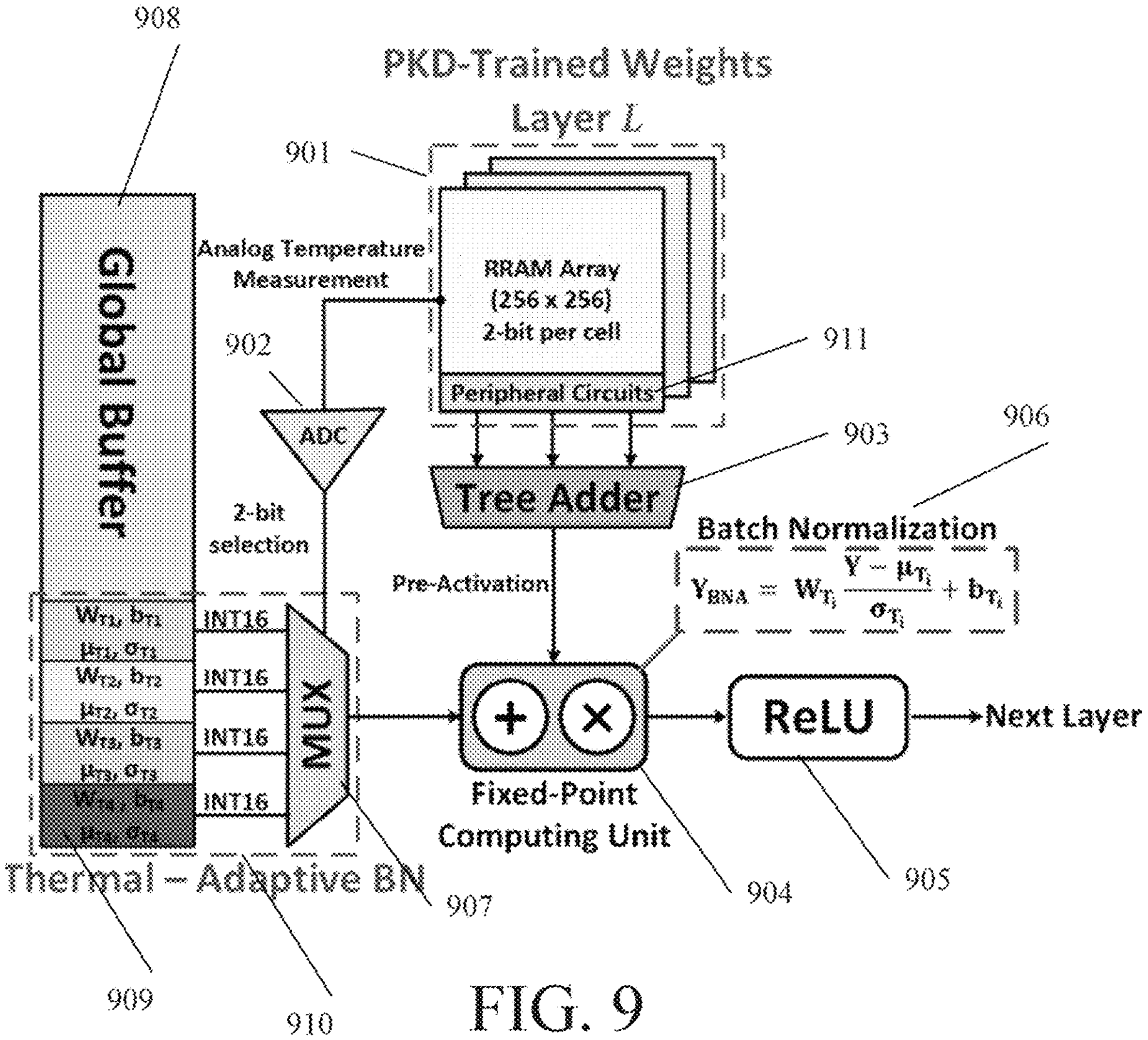
FIG. 9 is an exemplary high-level hardware implementation of the proposed PKD-BNA algorithm.

Referring now to FIG. 9, after training the model with both the PKD and BNA algorithms, PKD-trained low-precision weights were mapped to the RRAM array. To implement the BNA algorithm in hardware, additional circuits for on-chip temperature measurement and BN multiplexing are necessary. The compact temperature sensor circuits from Yang et al.'s work (T. Yang, S. Kim, P. R. Kinget, and M. Seok, "Compact and supply-voltage-scalable temperature sensors for dense on-chip thermal monitoring," IEEE J. Solid-State Circuits, vol. 50, no. 11, pp. 2773-2785, November 2015) were used as on-chip temperature sensors where the proportional-to-absolute-temperature and complementary-to-absolute temperature voltages were digitized using a 16-bit off chip ADC for accurate temperature digitization.

As discussed in the previous section, the temperature was coarsely divided into four ranges and each range had a corresponding set of BN parameters. Therefore, only a 2-bit analog-to-digital converter (ADC) was needed to quantize the analog temperature sensor voltages, for which a flash ADC was employed with three sense amplifiers. Amplifiers may be used to provide power gain, isolation, voltage gain, etc. The 2-bit ADC output may be connected to the select signal of a 4-to-1 multiplexer, which in turn chooses the corresponding pretrained BN parameters from, for example, an on-chip buffer. A 16-bit fixed-point representation for all BN parameters may be used for better hardware compatibility. Moreover, the BN operation for DNN inference may be performed inside a fixed-point computing unit. FIG. 9 depicts a high-level hardware implementation of the disclosed RRAM-based IMC scheme using the PKD-BNA algorithm. Compared with other solutions that require either very frequent refreshing or continuous BN calibration, the disclosed design is simple, and the hardware overhead is minimal.

Referring to FIG. 9, the RRAM array 901 may in some embodiments be connected to a tree adder 903 via peripheral circuits 911. A fixed-point computing unit 904 may be configured to perform batch normalization 906 of the combined PKD-trained weights loaded from the RRAM Array 901. A thermal sensor (not shown) may be positioned near the RRAM array 901 to measure a temperature of the RRAM array, providing in some examples an analog voltage value which may in turn be provided to an analog-to-digital converter (ADC) 902. The ADC 902 may in some embodiments operate one or more select pins of a multiplexer (MUX) 907, which in turn chooses BN values 909 from a global buffer 908 appropriate to the measured temperature from the temperature sensor (not shown). Although the MUX shown in FIG. 9 is a 4:1 MUX, it is understood that in various embodiments other MUXes may be used, including but not limited to a 2:1, 8:1, 12:1, 16:1, 32:1, or any suitable MUX. As would be understood by one skilled in the art, having a higher order MUX would allow for higher resolution tuning of the BN, but at the cost of greater complexity. The buffer 908 and the various BN values 909 and multiplexer 907 may collectively be referred to herein as a thermal-adaptive BN 910.

These BN values may be provided to the fixed-point computing unit 904 in order to calculate the BN values of the trained layer weights. The output of the BN run on the fixed point computing unit may be provided to a rectified linear unit (ReLU) 905. The ReLU 905 is a non-linear activation function that performs on multi-layer neural networks like the one disclosed herein; it may in some embodiments be connected to each layer in the RRAM array. In the ReLU layer, every negative value from the filtered image is removed and replaced it with zero. This function may only activate when the node input is above a certain quantity, thus when the input is below zero the output is zero. However, when the input value is above a certain threshold, it has a linear relationship with the dependent variable, therefore it is able to accelerate the speed of a training data set in a deep neural network that is faster than other activation functions.

Experimental Examples

The invention is further described in detail by reference to the following experimental examples. These examples are provided for purposes of illustration only and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the system and method of the present invention. The following working examples, therefore, specifically point out the exemplary embodiments of the present invention and are not to be construed as limiting in any way the remainder of the disclosure.

Presented below are the experimental results for the CIFAR-10 and TinyimageNet data sets. The PKD algorithm fine-tuned the pretrained low-precision DNN model using stochastic gradient descent for optimization and the straight-through estimator (Y. Bengio, N. Leonard, and A. Courville, "Estimating or propagating gradients through stochastic neurons for conditional computation," 2013, arXiv:1308.3432. [Online]. Available: https://arxiv.org/abs/1308.3432) for gradient approximation. The baseline 2-bit and 4-bit DNN models were fully quantized for all layers using the PACT quantizer (J. Choi et al., "Accurate and efficient 2-bit quantized neural networks," in Proc. Conf. Mach. Learn. Syst., 2019, pp. 348-359). For both PKD and BNA training, the EMA (P. Izmailov et al., "Averaging weights leads to wider optima and better generalization," in Proc. Conf. Uncertainty Artif. Intell., 2018, pp. 876-885) technique was incorporated with a momentum of 0.9997 to improve the knowledge distillation. The circuit level simulator NeuroSim (X. Peng, S. Huang, Y. Luo. X. Sun, and S. Yu, "DNN NeuroSim: An end-to-end benchmarking framework for compute-in-memory accelerators with versatile device technologies," in Proc. IEEE Int. Electron Devices Meeting, 2019, pp. 32.5.1-32.5.4) was used to evaluate the hardware performance of the proposed design. The RRAM array size was 256 rows by 256 columns and 6-bit ADCs were employed at the column periphery to digitize the IMC partial sums.

Static Retention Variation Results

First, the disclosed system was evaluated based on static retention variations, with the baking temperature varying from 25 degrees Celsius to 120 degrees Celsius. The injected variation of each temperature is Gaussian noise, where the mean and standard deviation are averaged across the operating time from 20 to 10,000 seconds. After implementing the proposed PKD training from 25 degrees Celsius to 35 degrees Celsius with 20 epochs fine-tuning, the BNA algorithm was subsequently applied for training with 55 degrees Celsius, 85 degrees Celsius, and 120 degrees Celsius noise levels throughout 20 epochs for each temperature.

Figure 10C:
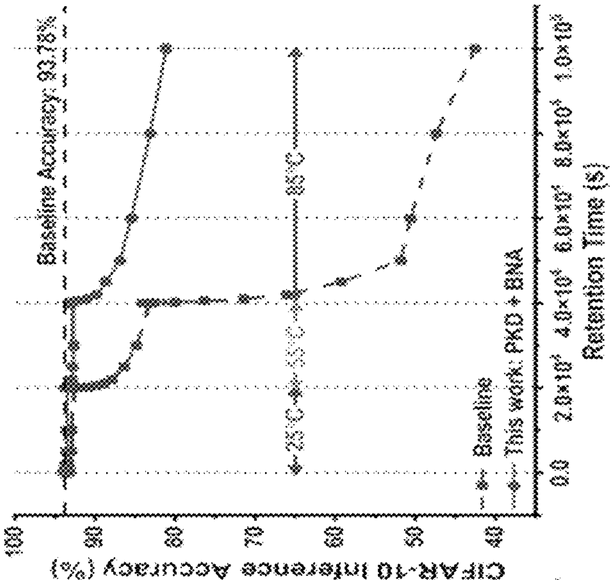
FIG. 10C shows RRAM in-memory computing hardware experimental inference results with the 2-bit ResNet-18 model for dynamic thermal variations at different temperatures.
Figure 10B:
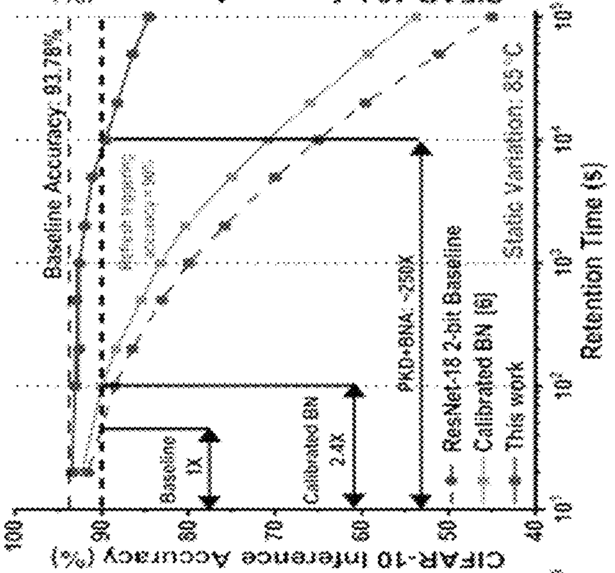
FIG. 10B is an experimental accuracy and refresh frequency comparison among the baseline model, prior work, and the proposed work.
Figure 10A:
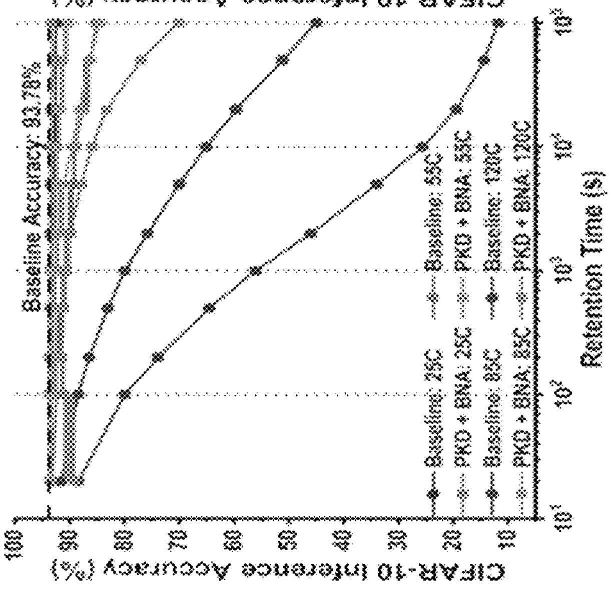
FIG. 10A shows RRAM in-memory computing hardware experimental inference results with the 2-bit ResNet-18 model for static retention variations at different temperatures.

As shown in FIG. 10A, an RRAM IMC hardware inference results with the 2-bit ResNet-18 model for static retention variations at different temperatures. For each of the four temperature ranges employed for the BNA algorithm, one set of fixed-point BN parameters (trained by BNA) may be used to cover the entire time period of the experiment, which is 20-100,000 seconds.

As shown in FIG. 10B, calibrating BN with EMA (L. H. Tsai et al., "Robust processing-in-memory neural networks via noise-aware normalization," 2020, arXiv:2007.03230. [Online]. Available: https://arxiv.org/abs/2007.03230) had a limited improvement to the DNN model robustness. Compared to the IMC inference results when the baseline quantized DNN model was used without any noise injection, the proposed method improved the inference accuracy by a significant margin. As the temperature changed, the corresponding set of BN parameters were selected, and none of the RRAM weights were updated or retrained. Though the accuracy may not be fully recovered when running the inference with a long operating time and high temperature like 120 degrees Celsius, the high degree of robustness in the proposed scheme significantly reduces energy consumption from periodic RRAM refreshing. If it is assumed that refresh is triggered when the inference accuracy is lower than 90%, FIG. 10B shows that the baseline model requires periodic refreshing after about 30 seconds of operation. On the other hand, the proposed PKD-BNA combined method can maintain a greater than 90% accuracy until 10,000 seconds. Compared to the ideally quantized baseline model and Calibrated BatchNorm (L. H. Tsai et al., "Robust processing-in-memory neural networks via noise-aware normalization," 2020, arXiv:2007.03230. [Online]. Available: haps://arxiv.org/abs/2007.03230), the disclosed scheme can reduce the refreshing frequency by about 250 times and about 100 times, respectively.

According to Gao's work (R. Gao et al., "Convergence of adversarial training in overparametrized neural networks," Adv. Neural Inf. Process. Syst., vol. 32, pp. 13029-13040, 2019), wider DNNs usually have a relatively higher robustness. Herein, the proposed algorithm is applied to both a large model, such as ResNet-18 with 11.17 million parameters, and a compact model, such as a ResNet-20 with 0.27 million parameters. Following the training scheme of FIG. 6, Table 1 below shows successful inference accuracy recovery with the compact 4-bit ResNet-20 model for the CIFAR-10 data set. The bolded text is used below to highlight the accuracy improvements of the proposed algorithm.

TABLE 1

RRAM HARDWARE INFERENCE ACCURACY RESULTS

| Dataset | DNN Model | Scheme | Accuracy for 25° C. (static) at 20 seconds | Accuracy for 55° C. (static) at 1000 seconds |
|---|---|---|---|---|
| CIFAR-10 | 4-bit | Baseline | 91.61 ± 0.46 | 67.15 ± 1.04 |
| | ResNet-20 | This work | 91.69 ± 0.31 | 91.39 ± 0.42 |
| TinyIm- | 4-bit | Baseline | 70.51 ± 0.51 | 0.63 ± 0.25 |
| ageNet | ResNet-18 | This work | 71.23 ± 0.44 | 67.56 ± 0.52 |

Table 1 also shows the performance of the proposed scheme with the large 4-bit ResNet-18 model for the TinylmageNet data set. The model trained by the complex data set, such as TinylmageNet, is more sensitive to the variations. Fully recovering the model accuracy might require additional sets of adaptive BN parameters within a single operating temperature.

Dynamic Retention Variation Results

Assuming that the temperature of the RRAM hardware increases over time, as in FIGS. 3A, 3B, and 3C, the disclosed scheme is applied to the 2-bit ResNet-18 for the CIFAR-10 data set to evaluate the dynamic retention variation scenario. Now referring to FIG. 10C, the operating temperature changes occurred at the times of $2\times10^4$ (25° C.→55° C.) and $4\times10^4$ (55° C.→85° C.). While the baseline DNN suffered about a 48% accuracy degradation at 1×10 5 seconds, the disclosed scheme showed only about an 8% accuracy drop against the large temperature variation in the same period.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method for elevating a model robustness to a temperature-induced retention failure of a neural network, the method comprising:

modeling RRAM non-ideality based on real RRAM-chip measurements using a resistive nonvolatile in-memory-computing chip;

training a deep neural network using a progressive knowledge distillation algorithm to distill robustness from a teacher model to a student model, the progressive knowledge distillation algorithm comprising:

injecting low temperature noises to the student model using a clean model as the teacher model;

injecting, now using the student model as the teacher model, high temperature noises to an inherited student model; and training the deep neural network model, while the model remains fixed, using a batch normalization adaptation algorithm, wherein the batch normalization adaptation algorithm includes training a plurality of batch normalization parameters with respect to a plurality of thermal variations.

2. The method of claim 1, wherein the low-temperature noise values are modeled based on actual on-chip measurements and a temporally averaged variation between 0 and 10,000 seconds of each temperature range.

3. The method of claim 1, wherein the batch normalization adaptation algorithm is performed while keeping at least one weight of the neural network fixed.

4. The method of claim 1, wherein the low-temperature noises are injected at the plurality of thermal variations.

5. The method of claim 1, wherein each thermal variation of the plurality of thermal variations corresponds to a set of batch normalization parameters of the plurality of batch normalization parameters.

6. The method of claim 1, wherein the progressive knowledge distillation algorithm is implemented at a thermal variation between 25 and 35 degrees Celsius with 20 epoch fine-tuning.

7. The method of claim 1, wherein the batch normalization adaptation algorithm is implemented at thermal variations of 55, 85, and 120 degrees Celsius with 20 epoch fine-tuning for each.

* * * * *